United States Patent [19]
Yamamoto

[11] Patent Number: 5,961,938
[45] Date of Patent: Oct. 5, 1999

[54] METHOD FOR RECOVERING REUSABLE ELEMENTS FROM RARE EARTH-IRON ALLOY

[75] Inventor: Kazuhiro Yamamoto, Kobe, Japan

[73] Assignee: Santoku Metal Industry Co., Ltd, Hyogo-ken, Japan

[21] Appl. No.: 08/799,089

[22] Filed: Feb. 11, 1997

[30] Foreign Application Priority Data

Feb. 13, 1996 [JP] Japan ................................. 8-025553

[51] Int. Cl.⁶ ............................................. C01F 17/00
[52] U.S. Cl. .................................... 423/21.1; 423/263
[58] Field of Search ........................ 423/21.1, 150.1, 423/150.3, 263

[56] References Cited

FOREIGN PATENT DOCUMENTS

| | | | |
|---|---|---|---|
| 63-182216 | 7/1988 | Japan | 423/21.1 |
| 1-183415 | 7/1989 | Japan | 423/21.1 |
| 5-287405 | 11/1993 | Japan | 423/21.1 |

OTHER PUBLICATIONS

Translation of Japan 63–182216, Jul. 1988.
Translation of Japan 05–287405, Nov. 1993.

*Primary Examiner*—Steven Bos
*Attorney, Agent, or Firm*—Darby & Darby

[57] ABSTRACT

A method for recovering rare earth elements and cobalt from a rare earth-iron alloy containing cobalt is disclosed, including the steps of:

a preparing a slurry of the rare earth-iron alloy containing cobalt, adding a diluted nitric acid solution to the slurry with air being introduced into the slurry, while maintaining pH of a resulting mixture at 5 or higher to dissolve metals including rare earth metals and cobalt at 50° C. or lower, and separating an undissolved residue containing iron from a rare earth-containing nitrate solution by filtration.

8 Claims, 1 Drawing Sheet

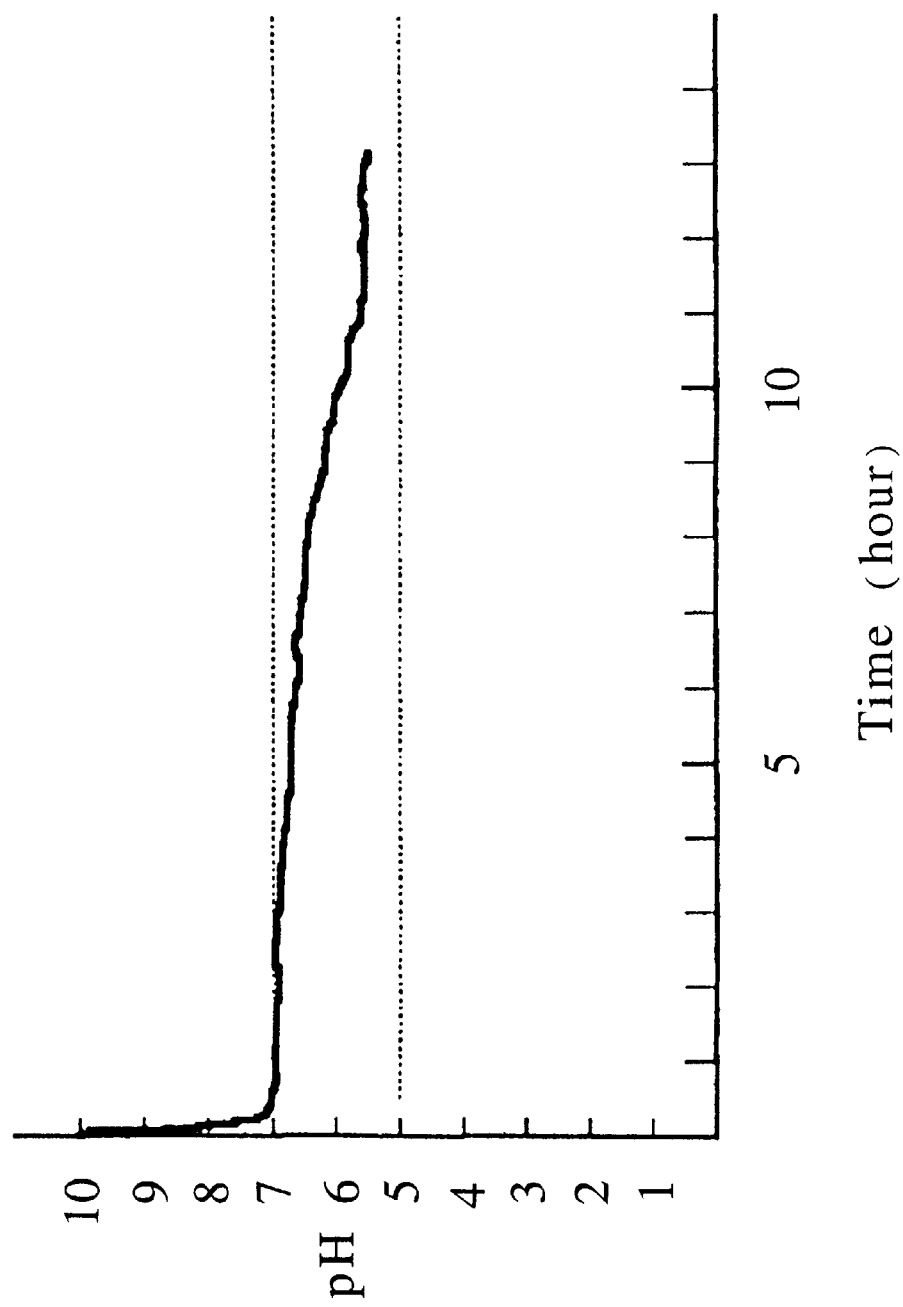

METHOD FOR RECOVERING REUSABLE ELEMENTS FROM RARE EARTH-IRON ALLOY

BACKGROUND OF THE INVENTION

The present invention relates to a method for economically recovering rare earth elements and cobalt from a rare earth-iron alloy containing cobalt.

PRIOR ART

A rare earth-iron alloy has increasingly been used in a permanent magnet due to its high magnetic properties. The rare earth-iron alloy usually contain cobalt, and optionally aluminum, boron, or the like, depending on its use.

In producing a magnet using the rare earth-iron alloy, a large quantity of alloy wastes, swarf, alloy slug, and the like are generated. Thus, it is urgently demanded to recover the expensive rare earth elements. Publicly known methods for recovering reusable elements include: (1) an acid dissolving method (Japanese Patent Publication No. 63-4028 and Japanese Laid-open Patent Application No. 2-22427); (2) a method employing calcining, oxidizing, and eluting (Japanese Laid-open Patent Application No. 62-83433); (3) a method employing dissolving of all metals and separating with hydrofluoric acid (Japanese Laid-open Patent Application No. 62-187112); and (4) a method employing acid dissolving under pH control and oxidizing (Japanese Patent Publication No. 7-72312).

However, these publicly known methods have various defects for processing a large quantity of alloy at low cost.

The acid dissolving method (1) disclosed in Japanese Patent Publication No. 63-4028 and Japanese Laid-open Patent Application No. 2-22427 has problems that the amount of acid required for dissolving all the metals exceeds the equivalent; and that a costly method should be employed for separating rare earth elements from the solution in which they are dissolved such as a solvent extraction method or a chemical separating method utilizing precipitation with oxalic acid. It is merely described in these publications that hydrochloric acid can advantageously be used as the acid used in this method, but details of the dissolving mechanism using nitric acid are not described.

The method (2) employing calcining, oxidizing, and eluting disclosed in Japanese Laid-open Patent Application No. 62-83433 has advantages that once the alloy sludge is ignited in the furnace, no further energy cost is required for oxidation since the alloy sludge is ignitable; that only the amount of acid required for eluting rare earth elements is needed; and that iron and rare earth elements can be separated highly efficiently in the acid dissolving process. However, this method has disadvantages that the furnace used is costly; that eluting ratio upon acid elution is low, and expensive cobalt contained in the alloy cannot be eluted.

The method (3) employing dissolving of all metals and separating with hydrofluoric acid disclosed in Japanese Laid-open Patent Application No. 62-187112 has problems that, as in the method (1), the amount of acid required for dissolving all the metals exceeds the equivalent; and that a great quantity of fluorine compound should be added which contains more fluorine ions than the required amount for precipitating rare earth fluorides since the fluorine ions added for precipitating rare earth fluorides is spent for forming complex ions with iron ions existing in large quantity.

The method (4) employing acid dissolving under pH control and oxidizing disclosed in Japanese Patent Publication No. 7-72312 has problems that, though it is necessary to maintain pH of the solution at 3 to 5 in eluting rare earth elements, it is extremely difficult to do so in an industrial scale treatment; and that upon precipitating rare earth carbonates from an eluting solution using hydrochloric acid as the acid, trace chlorine ions remain in the precipitated carbonates, which ions survive in the rare earth oxides obtained by calcining the precipitated carbonates. It is known that a rare earth metal produced from the rare earth oxides containing trace chlorine ions adversely affect magnet properties when it is used for a permanent magnet.

In the above methods, the acid practically used for dissolving, leaching, or eluting rare earth metals, iron, and other metals is usually hydrochloric acid even when the disclosure simply defines as "an acid". Otherwise, the use of sulfuric acid is sometimes disclosed. This is because the hydrochloric acid dissolves the metals quickly, and is available at low cost, though the risk of explosion due to generation of hydrogen gas as represented by the formula (1) below is involved.

$$2R + 6HCl \rightarrow 2RCl_3 + 3H_2 \uparrow \qquad (1)$$

(Throughout this text, R in the formulae stands for a rare earth element such as Nd or a mixture thereof.)

The sulfuric acid dissolves the metals similarly as represented by the formula (2) below, but the reaction speed is low, and solubility of the salts is low, so that a solution with high concentration cannot be obtained.

$$2R + 3H_2SO_4 \rightarrow R_2(SO_4)_3 + 3H_2 \uparrow \qquad (2)$$

It is known that, if nitric acid is used as the acid, unique reactions shown below by the formula (3) will occur in the reaction system, which are different from the reaction of hydrochloric acid or sulfuric acid.

$$2R + 8HNO_3 \rightarrow 2R(NO_3)_3 + 2NO \uparrow + 4H_2O \qquad (3)$$

Here, NO generated in the reaction is associated with air to give highly toxic $NO_2$ gas of brown color. Further, nitric acid is more expensive than other acids, but excess acid is required upon dissolving the metals as seen from the formula (3). Thus, it has not been considered proper to use nitric acid when the process should be carried out at low cost.

SUMMARY OF THE INVENTION

Therefore, it is an object of the present invention to provide a method for economically recovering elements reusable as magnet materials or the like from a rare earth-iron alloy with safety, wherein the obtained reusable elements are free of chlorine ions or the like.

According to the present invention, there is provided a method for recovering rare earth elements and cobalt from a rare earth-iron alloy containing cobalt comprising the steps of:

preparing a slurry of the rare earth-iron alloy containing cobalt, adding a diluted nitric acid solution to said slurry at 50° C. or lower with air being introduced into said slurry, while maintaining pH of a resulting mixture at 5 or higher to dissolve metals containing rare earth metals and cobalt, and separating an undissolved residue containing iron from a rare earth-containing nitrate solution by filtration.

According to the present invention, there is further provided the above method further comprising the steps of:

adding a fluorine compound to said separated rare earth-containing nitrate solution to precipitate rare earth fluorides, and separating said rare earth fluorides from a nitrate solution containing residual cobalt by filtration.

According to the present invention, there is further provided the above method further comprising the steps of:

adding a component selected from the group consisting of oxalic acid, ammonium oxalate, and mixtures thereof to said separated rare earth-containing nitrate solution to precipitate rare earth oxalates, and separating said rare earth oxalates from a nitrate solution containing residual cobalt by filtration.

BRIEF DESCRIPTION OF THE DRAWINGS

FIG. 1 is a graph showing change in pH value of the slurry during the reaction by adding a diluted nitric acid solution in Example 1.

PREFERRED EMBODIMENT OF THE INVENTION

In the method of the present invention, first a slurry of a rare earth-iron alloy containing cobalt is prepared. As the rare earth-iron alloy, alloy wastes, swarf, or slug generated in the course of production of magnets may be used. The rare earth-iron alloy contains rare earth metals, iron, and cobalt, and may optionally contain Al, B, Ti, Ni, V, Nb, Ta, Cr, Mo, W, Ga, Hf, Zr, and a variety of other inevitably contained elements. Examples of the rare earth metals may include light rare earth metals such as Nd, heavy rare earth metals such as Dy, or mixtures thereof.

The slurry may be prepared by pulverizing the rare earth-iron alloy such as alloy wastes, swarf, slug, or the like into powders having average particle size of preferably 5 to 50 $\mu$m, and suspending the powders in water. The pulverization may be carried out by a conventional pulverizer, but it is preferred to use a wet ball mill since the alloy itself is highly ignitable. Alternatively, a publicly known method wherein the alloy is pulverized by hydrogenation is also preferred. The pulverization may not necessarily be carried out when the rare earth-iron alloy is in a powdered state with the desired particle size. The suspension of the powders in water may preferably be carried out so that the concentration of the metals in the suspension is 300 to 600 g/liter.

In the method of the present invention, a diluted nitric acid solution is added to the slurry with air being introduced into the slurry. The introduction of the air into the slurry may be carried out so that the slurry bubbles with the air.

The diluted nitric acid solution added to the slurry with air being introduced into the slurry has concentration of preferably not higher than 39 wt %, more preferably 21 to 28 wt % of nitric acid based on the solution. That is, the diluted nitric acid solution may be prepared by diluting a nitric acid solution for industrial use having concentration of 67 to 68 wt % with water of the same volume as the nitric acid solution or more, preferably of two to three times the volume of the nitric acid solution. If the volume of the water used to dilute the nitric acid solution is less than the volume of the nitric acid solution, the nitric acid added to the slurry may be decomposed to generate toxic NO gas (which is further converted into toxic $NO_2$ gas upon contacting with air).

The addition of the diluted nitric acid solution may be carried out, for example, by first adding about one-tenth the quantity of the diluted nitric acid solution theoretically required for dissolving rare earth metals and cobalt contained in the slurry, preferably continuously over 30 minutes to 1 hour, under stirring while air is introduced into the slurry. It is preferred to continue stirring and introducing air into the resulting mixture even after the addition of the above diluted nitric acid solution is finished. The reaction proceeds by introducing air into the mixture even after the completion of addition of the above diluted nitric acid solution. In this case, the quantity of the air introduced into the mixture is preferably reduced when the temperature of the mixture exceeds 40° C. Then, when the temperature of the mixture is dropped below 40° C., about nine-tenth of the above theoretical quantity of the diluted nitric acid solution is added to the mixture continuously, preferably over 5 to 10 hours, while pH of the mixture is maintained at 5 or higher by adjusting the adding rate of the diluted nitric acid solution, thereby dissolving the metals including rare earth metals and cobalt. In this step, the adjustment of the adding rate of the diluted nitric acid solution is necessary not only for adjusting pH but also for maintaining the temperature of the mixture at 50° C. or lower. If pH drops below 5, this means that excess amount of nitric acid is uneconomically contained in the slurry. If pH drops further, the iron may be dissolved as iron nitrate in the resulting mixture, to thereby lower the purity of rare earth metals and cobalt in the mixture. Moreover, the nitric acid added may be decomposed to generate toxic NO gas.

Finally, the addition of the diluted nitric acid solution may be stopped when the pH of the mixture becomes about 5.5, and preferably the stirring is continued for additional 1 to 5 hours to complete dissolving of the metals including rare earth metals and cobalt.

The above reactions until the completion of the dissolution are explained chemically with reference to the reaction formulae hereinbelow.

In a slurry of rare earth-iron alloy, some of the rare earth metals exposed on the surface of the alloy particles react with water in accordance with the following formulae to become hydroxides, a portion of which is further dissociated. Thus, pH of the slurry is usually not lower than 7.

$$2R+6H_2O \rightarrow 2R(OH)_3+3H_2 \uparrow \quad (4)$$

$$2R(OH)_3 \rightarrow 2R^{3+}+3(OH)^- \quad (5)$$

The present inventor has reached a novel findings that when the diluted nitric acid solution is added to the slurry under the above conditions, the reactions represented by the formulae below are proceeded, in the light of the results of experiments.

$$R(OH)_3+3HNO_3 \rightarrow R(NO_3)_3+3H_2O \quad (6)$$

$$8R+30HNO_3 \rightarrow 8R(NO_3)_3+3NH_4NO_3+9H_2O \quad (7)$$

If the rare earth metals remain in the slurry near pH 7, the rare earth nitrates are hydrolyzed as represented by the formula (8), and generated nitric acid is used in the reaction represented by the formula (7)

$$R(NO_3)_3+3H_2O \rightarrow R(OH)_3+3HNO_3 \quad (8)$$

In other words, in the presence of nitric acid, the following formula (9) is obtained from the formulae (7) and (8).

$$8R+6HNO_3+15H_2O \rightarrow 8R(OH)_3+3NH_4NO_3 \quad (9)$$

Accordingly, rare earth metals may safely be changed to rare earth hydroxides with only a small quantity of nitric acid without hydrogen being generated. The rare earth hydroxides generated react according to the formula (6) as the amount of the nitric acid added increases, and dissolve as rare earth nitrates without hydrogen gas being generated, unlike the reaction wherein hydrochloric acid is used as the acid.

On the other hand, it is also found that iron contained in the slurry is precipitated through a behavior which is different from the conventionally known reaction. That is, when the diluted nitric acid solution is added to the slurry with the air being introduced into the slurry, pH of the mixture changes around 7, and reactions proceed according to the formulae (10) to (12) below.

$$4Fe + 10HNO_3 \rightarrow 4Fe(NO_3)_2 + NH_4NO_3 + 3H_2O \quad (10)$$

$$4Fe(NO_3)_2 + 4HNO_3 + O_2 \rightarrow 4Fe(NO_3)_3 + 2H_2O \quad (11)$$

$$4Fe(NO_3)_3 + 12H_2O \rightarrow 4Fe(OH)_3 + 12HNO_3 \quad (12)$$

The reactions represented by the formulae (10) to (12) proceed successively, and the nitric acid generated in accordance with the formula (12) reacts with fresh iron. Thus, the following formula (13) is obtained.

$$4Fe + 2HNO_3 + O_2 + 7H_2O \rightarrow 4Fe(OH)_3 + NH_4NO_3 \quad (13)$$

On the other hand, cobalt dissolves in accordance with the following formula (14) to dissolve with rare earth metals in the rare earth-containing nitrate solution to be discussed later.

$$4Co + 10HNO_3 \rightarrow 4Co(NO_3)_2 + NH_4NO_3 + 3H_2O \quad (14)$$

When the rare earth-iron alloy contains boron, boron dissolves in the rare earth-containing nitrate solution as boric acid, although the reaction formula of boron is not known. When the rare earth-iron alloy contains aluminum, aluminum coprecipitates with an iron hydroxide as an insoluble hydroxide.

Incidentally, regarding the above formulae (9), (13) and (14), $NH^{4+}$ in the mixture has been confirmed of its presence and quantitatively analyzed by an ion-exchange chromatograph analyzer manufactured by YOKOGAWA ANALYTICAL SYSTEMS INC.

When pH of the mixture is around 7, the diluted nitric acid solution added to the slurry is predominantly spent in the reactions represented by the formulae (9) and (13), if the introduction of the air is continued. In other words, by adding the diluted nitric acid solution at a rate slower than the reaction rate, pH of the mixture changes around 7 until all the iron contained in the slurry is changed into iron (III) hydroxide. After the completion of the reaction represented by the formula (13), the reaction represented by the formula (6) proceeds, and the rare earth hydroxides are dissolved to become nitrates. These successive reactions are exothermic, and thus the temperature of the mixture is increased with the progress of the reaction. When the temperature of the mixture exceeds 50° C., the diluted nitric acid solution added is decomposed as represented by the formula (15), thereby generating toxic $NO_2$ gas.

$$2HNO_3 \rightarrow 2NO_2 + H_2O + 1/2O_2 \quad (15)$$

Therefore, it is necessary to proceed with the reaction with the temperature of the mixture being controlled at 50° C. or lower. The control of the temperature may be carried out by lowering the adding rate of the diluted nitric acid solution, or by decreasing the quantity of the air introduced into the slurry. If the treatment of the rare earth-iron alloy is to be carried out in a large scale, it is preferred to effect the reaction in a dissolving vessel fitted with a cooling device. Incidentally, since the rare earth elements dissolve in accordance with the formula (8) followed by the formula (6), if both light rare earth elements such as Nd and heavy rare earth elements such as Dy are present in the mixture, the light rare earth elements and the heavy rare earth elements may roughly be separated by adjusting the adding rate of the diluted nitric acid solution.

According to the above reaction formulae, the metals including rare earth elements and cobalt to be recovered are dissolved as nitrates, while iron is precipitated as iron (III) hydroxide. The rare earth-containing nitrate solution can be separated from the precipitate containing iron (III) hydroxide by filtration using, for example, a conventional filter press.

In the method of the present invention, a fluorine compound is added to the separated rare earth-containing nitrate solution to precipitate rare earth fluorides, and the rare earth fluorides are separated from a nitrate solution containing residual cobalt by filtration.

The fluorine compound may be added to the rare earth-containing nitrate solution preferably in the form of a solution, such as a solution of acid ammonium fluoride, a solution of hydrofluoric acid, or the like. The concentration of the solution of the fluorine compound is preferably 0.5 to 5 N, and the amount of the solution of the fluorine compound to be added is preferably 1.1 to 1.3 equivalent of the rare earth elements contained in the rare earth-containing nitrate solution in terms of the fluorine ions.

After the rare earth fluorides are precipitated, the separation of the precipitated rare earth fluorides from the nitrate solution containing the residual cobalt by filtration may be carried out, for example, by first neutralizing the cobalt-containing nitrate solution containing the precipitate with aqueous ammonia or the like to adjust the pH preferably to 3 to 4, and then separating the precipitate by filtration using a conventional filtering device such as a filter press.

The separated rare earth fluorides may suitably be used as a bath salt material for electrolysis to produce rare earth metals by drying the separated rare earth fluorides at 200 to 500° C. for 1 to 10 hours to convert the same into rare earth fluoride anhydrides.

On the other hand, in the filtrate nitrate solution from which the rare earth fluorides have been separated by filtration, cobalt, which could not have been recovered by the above method (2) employing calcining, oxidizing, and eluting, is dissolved as cobalt nitrate. Thus, the cobalt may be separated by adding soda ash (sodium carbonate) or caustic soda (sodium hydroxide) to the filtrate nitrate solution to precipitate cobalt carbonate or cobalt hydroxide, and separating the precipitate by filtration. The obtained cobalt hydroxide and the like may be dissolved in hydrochloric acid to recover cobalt chloride solution.

In the method of the present invention, oxalic acid and/or ammonium oxalate is added to the above rare earth-containing nitrate solution to precipitate rare earth oxalates, and the precipitated rare earth oxalates are separated from the nitrate solution containing residual cobalt by filtration.

The oxalic acid and/or ammonium oxalate is added to the rare earth-containing nitrate solution preferably in the form of a solution of 1 to 5 N or powders. The amount of the oxalic acid and/or ammonium oxalate to be added is preferably 1.1 to 1.3 equivalent of the rare earth elements contained in the rare earth-containing nitrate solution in terms of oxalic acid.

After the rare earth oxalates are precipitated, the separation of the precipitated rare earth oxalates from the nitrate solution containing residual cobalt by filtration may be carried out, for example, by first neutralizing the cobalt-containing nitrate solution containing the precipitate with aqueous ammonia or the like to adjust the pH preferably to 3 to 4 for completing the precipitating reaction. Subsequently, the precipitate is separated by filtration using a conventional filtering device such as a filter press.

The separated rare earth oxalates may suitably be used as materials for electrolysis to produce rare earth metals by calcining the separated rare earth oxalates at 500 to 1100° C. to convert the same into rare earth oxides.

On the other hand, in the filtrate nitrate solution from which the rare earth oxalates have been separated by filtration, cobalt is dissolved as cobalt nitrate. Thus, the cobalt may be separated by adding soda ash or caustic soda to the filtrate nitrate solution as described above to precipitate cobalt carbonate or cobalt hydroxide. The precipitate may further be dissolved in hydrochloric acid to recover cobalt chloride solution.

According to the method of the present invention, rare earth elements and cobalt may be recovered as nitrates from alloy wastes, swarf, scrap, sludge, or the like of rare earth-iron alloy generated in producing rare earth magnets by separating rare earth elements and cobalt from precipitate of iron (III) hydroxide highly efficiently. Further, the rare earth elements may be recovered as fluorides or oxides for use as starting materials for producing the same alloy, and cobalt may be recovered as reusable chloride. Moreover, by using nitric acid, which has not been used because of the problems of pollution and high cost, only in a small amount required for dissolving substantially the rare earth elements and cobalt, the reusable elements can be recovered more efficiently and more economically than conventional methods.

EXAMPLES

The present invention is now described in more detail with reference to Examples and Comparative Examples, but the present invention is not limited thereto.

Example 1

Swarf of rare earth-iron-boron magnets having the metallic composition of 33.0 wt % of rare earth elements containing 98 wt % of neodymium, 62.4 wt % of iron, 1.2 wt % of boron, 0.2 wt % of aluminum, and 3.2 wt % of cobalt, was measured out to contain 500 g of metallic components. The swarf was pulverized in a wet ball mill into powders having the average particle size of 15 $\mu$m, charged in a dissolving vessel fitted with a stirrer, and mixed with water to prepare 1 liter of a slurry. Air injection pipes were inserted into the vessel for introducing air into the slurry. Then 150 ml of a 5 N nitric acid solution (volume ratio of the nitric acid solution for industrial use to water is 1:1.89) was added to and dissolved in the slurry at the rate of 3 ml/min. while air was introduced into the slurry at the rate of 300 ml/min. After the addition of the nitric acid solution was ended, stirring by introducing the air was continued for additional two hours. During stirring, the amount of the air introduced was reduced when the temperature of the mixture exceeded 40° C. so that the temperature of the mixture became stable below 40° C.

Subsequently, the 5 N nitric acid solution was added to the mixture at the rate of 3 ml/min. while air was introduced into the mixture at the rate of 300 ml/min. The addition of the nitric acid solution was stopped when pH of the mixture became 5.5. The quantity of the nitric acid solution added to the mixture at this stage was 1400 ml. Then, stirring was continued for additional two hours while air was introduced into the mixture. The total amount of the nitric acid added to the slurry was 1550 ml. The pH of the mixture from the start until the end of the addition of the nitric acid solution was maintained at 5 or higher as shown in FIG. 1. The temperature of the mixture from the start until the end of the addition of the nitric acid solution was within the range of 15 to 45° C., thus maintained at 50° C. or lower.

The obtained mixture was filtered by a Nutsche type filter device followed by washing, thereby separating the precipitate from the solution. The obtained solution amounted 3150 ml. By gravimetric analysis and ICP atomic emission spectrochemical analysis, it was revealed that rare earth elements, cobalt, and boron were dissolved in the solution. The yield of the rare earth elements was 98.2%, while the yield of cobalt was 97.6%. On the other hand, the separated precipitate was analyzed by ICP atomic emission spectrochemical analysis to reveal that the precipitate was composed of iron (III) hydroxide and aluminum hydroxide.

The solution wherein rare earth elements, cobalt, and boron were dissolved was divided into two portions, one of which was subjected to recovery using a fluorine compound, and the other of which was subjected to recovery using oxalic acid, as will be described below.

Recovery Using Fluorine Compound 1500 ml of the solution obtained above was charged in a stirring vessel, and mixed with 300 ml of an acid ammonium fluoride solution having the concentration of 200 g/liter to precipitate rare earth fluorides. The precipitate was separated by filtration, washed, and dried at 600° C., thereby obtaining 107 g of rare earth fluorides. The filtrate from which the precipitate had been separated and the wash solution were collected, and mixed with 70 g of caustic soda, thereby precipitating cobalt hydroxide, which was then separated by filtration. The obtained cobalt hydroxide was washed, and dissolved in hydrochloric acid, to obtain 158 ml of a cobalt chloride solution having the concentration of 91.6 g/liter. Purity and recovery ratio of the rare earth fluorides and cobalt chloride are shown in Table 1.

Recovery Using Oxalic Acid 1500 ml of the solution obtained above was charged in a stirring vessel, and mixed with 600 ml of an oxalic acid solution having the concentration of 150 g/liter to form a precipitate. Further, pH of the mixed solution was adjusted to 4 with a caustic soda solution to precipitate rare earth oxalates. The precipitate was separated by filtration, washed, and calcined at 1000° C., thereby obtaining 89.7 g of rare earth oxides. The filtrate from which the oxalates had been separated was mixed with 30 g of caustic soda to precipitate cobalt hydroxide, which was then separated by filtration. The separated precipitate was washed, and dissolved in hydrochloric acid, to obtain 138 ml of a cobalt chloride solution having the concentration of 104.6 g/liter. Purity and recovery ratio of the rare earth oxides and cobalt chloride are shown in Table 1.

Example 2

Slug generated in producing a rare earth-iron-boron alloy for magnet was coarsely crushed, and further pulverized in a wet ball mill into powders having the average particle size of 20 $\mu$m. The powders were charged in a dissolving vessel fitted with a stirrer, and mixed with water to prepare 1 liter of a slurry. The slurry was analyzed to reveal that the metallic composition of the slurry was 35.8 wt % of rare earth elements, 59.5 wt % of iron, 1.3 wt % of boron, 0.3 wt % of aluminum, and 3.1 wt % of cobalt, and the total weight of the metallic components was 521 g.

Then, 170 ml of a 5 N nitric acid solution was added to and dissolved in the slurry at the rate of 3 ml/min. while air was introduced into the slurry at the rate of 300 ml/min. After the addition of the nitric acid solution was ended, stirring by introducing the air was continued for additional two hours. During stirring, the amount of the air introduced was reduced when the temperature of the mixture exceeded 40° C. so that the temperature of the mixture became stable below 40° C.

Subsequently, the 5 N nitric acid solution was added to the mixture at the rate of 3 ml/min. while air was introduced into the mixture at the rate of 300 ml/min. When the pH of the mixture approached 5.5, frequency of pH measurement was increased. And the addition of the nitric acid solution was stopped when pH of the mixture became 5.5. The quantity of the nitric acid solution added to the mixture at this stage was 1490 ml. Then, stirring was continued for additional 3 hours while air was introduced into the mixture. The total amount of the nitric acid added to the slurry was 1660 ml. pH of the mixture from the start until the end of the addition of the nitric acid solution was maintained at 5 or higher. The temperature of the mixture from the start until the end of the addition of the nitric acid solution was within the range of 13 to 46° C., thus maintained at 50° C. or lower.

The obtained mixture was filtered by a Nutsche type filter device followed by washing, thereby separating the precipitate from the solution. The obtained solution amounted 3300 ml. By gravimetric analysis and ICP atomic emission spectrochemical analysis, it was revealed that rare earth elements, cobalt, and boron were dissolved in the solution. The yield of the rare earth elements was 97.8%, while the yield of cobalt was 97.5%. On the other hand, the separated precipitate was analyzed by ICP atomic emission spectrochemical analysis to reveal that the precipitate was composed of iron (III) hydroxide and aluminum hydroxide.

The solution wherein rare earth elements, cobalt, and boron were dissolved was divided into two portions, one of which was subjected to recovery using a fluorine compound, and the other of which was subjected to recovery using oxalic acid, as will be described below.

Recovery Using Fluorine Compound 1600 ml of the solution obtained above was charged in a stirring vessel, and mixed with 64 g of powdered acid ammonium fluoride to precipitate rare earth fluorides. The precipitate was separated by filtration, washed, and dried at 600° C., thereby obtaining 122.2 g of rare earth fluorides. The filtrate from which the precipitate had been separated and the wash solution were collected, and mixed with 35 g of caustic soda, thereby precipitating cobalt hydroxide, which was then separated by filtration. The obtained cobalt hydroxide was washed, and dissolved in hydrochloric acid, to obtain 158 ml of a cobalt chloride solution having the concentration of 87.0 g/liter. Purity and recovery ratio of the rare earth fluorides and cobalt chloride are shown in Table 1.

Recovery Using Oxalic Acid 1600 ml of the solution obtained above was charged in a stirring vessel, and mixed with 675 ml of an oxalic acid solution having the concentration of 150 g/liter to form a precipitate. Further, pH of the mixed solution was adjusted to 4 with a caustic soda solution to precipitate the rare earth oxalates. The precipitate was separated by filtration, washed, and calcined at 1000° C., thereby obtaining 102.4 g of rare earth oxides. The filtrate from which the oxalates had been separated was mixed with 35 g of caustic soda to precipitate cobalt hydroxide, which was then separated by filtration. The separated precipitate was washed, and dissolved in hydrochloric acid, to obtain 147 ml of a cobalt chloride solution having the concentration of 91.8 g/liter. Purity and recovery ratio of the rare earth oxides and cobalt chloride are shown in Table 1.

Example 3

Sludge of swarf, having the average particle size of 13 μm, of rare earth-iron-boron magnet having the metallic composition of 32.3 wt % of neodymium, 0.7 wt % of dysprosium, 62.5 wt % of iron, 1.2 wt % of boron, 0.2 wt % of aluminum, and 3.1 wt % of cobalt was measured out to contain 500 g of metallic component. The sludge was charged in a dissolving vessel fitted with a stirrer, and mixed with water to prepare 1 liter of a slurry. Then, 150 ml of a 5 N nitric acid solution was added to and dissolved in the slurry at the rate of 3 ml/min. while air was introduced into the slurry at the rate of 300 ml/min. After the addition of the nitric acid solution was ended, stirring by introducing the air was continued for additional 2 hours. During stirring, the amount of the air introduced was reduced when the temperature of the mixture exceeded 40° C. so that the temperature of the mixture became stable below 40° C.

Subsequently, 1350 ml of the 5 N nitric acid solution was added to the mixture at the rate of 3 ml/min. while air was introduced into the mixture at the rate of 300 ml/min. After the completion of the adding, the mixture was bubbled with air for additional 1 hour for stirring. The precipitate was filtered off by a Nutsche type filter device, thereby obtaining the primary solution.

The separated precipitate was charged back into the stirring vessel, mixed with 800 ml of water, stirred by introducing the bubbling air at the rate of 300 ml/min. The 5 N nitric acid solution was added to and dissolved in the mixture at the rate of 2 ml/min. The addition was stopped when pH of the mixture became 5.5. The quantity of the nitric acid solution added to the mixture at this stage was 110 ml. Then, stirring was continued for additional 2 hours while air was introduced into the mixture. The total amount of the nitric acid solution added to the slurry was 1610 ml. pH of the mixture from the start until the end of the addition of the nitric acid solution was maintained at 5 or higher. The temperature of the mixture from the start until the end of the addition of the nitric acid solution was within the range of 18 to 42° C., thus maintained at 50° C. or lower. After the completion of the dissolving, the precipitate was filtered off by a Nutsche type filter device, thereby obtaining the secondary solution.

The primary and the secondary solutions were subjected to the recovery using oxalic acid as in Example 1 to obtain neodymium oxide, dysprosium oxide, and 351 ml of a cobalt chloride solution having the concentration of 92.1 g/liter. The recovered amount and recovery ratio of each compound are shown in Tables 1 and 2.

Comparative Example 1

The swarf of magnet as employed in Example 1 was measured out to contain 500 g of metallic components, charged in a furnace, heated to 600° C. and ignited, thereby obtaining oxides. The obtained oxides were charged in a dissolving vessel fitted with a stirrer, mixed with water to adjust the volume to 1 liter, and stirred. Then 660 ml of a 5 N nitric acid solution was added to the mixture and stirred for 5 hours for dissolving. Undissolved residue was filtered off followed by washing, and the obtained filtrate and the wash solution together were subjected to the recovery using a fluorine compound as in Example 1, thereby obtaining 200.2 g of rare earth fluorides. Recovery ratio and purity are shown in Table 1.

Comparative Example 2

The swarf of magnet as employed in Example 1 was measured out to contain 500 g of metallic components, and charged in a dissolving vessel fitted with a stirrer, mixed with water to adjust the volume to 1 liter, and stirred. A 4 N hydrochloric acid was added to the mixture over 5 hours with air being introduced into the mixture, while adjusting the pH of the mixture to 3.5. Then, the stirring was continued for additional 5 hours for dissolving the metals. After the completion of dissolving, precipitate generated in the mixture was filtered off followed by washing, and the obtained filtrate and the wash solution together were charged in another vessel. The filtrate and the wash solution were mixed with sodium hydrogen carbonate to precipitate rare earth carbonates. The precipitated rare earth carbonates were separated by filtration, washed thoroughly, and calcined at 1100° C. for 3 hours, thereby obtaining 191.6 g of rare earth oxides. Recovery ratio and purity are shown in Table 1. The obtained oxides contained chlorine and cobalt at a high ratio, so that the oxides were not suitable for use as a starting material for producing rare earth metals for magnet alloy by electrolysis.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for recovering rare earth elements and cobalt from a rare earth-iron alloy containing cobalt comprising the steps of:

preparing a slurry of the rare earth-iron alloy containing cobalt, adding a diluted nitric acid solution wherein said nitric acid solution has a concentration of not higher than 39% by weight to said slurry with air being introduced into said slurry, while the pH of said slurry is maintained at 5 or higher to dissolve metals including rare earth metals and cobalt at 50° C. or lower, thereby obtaining a rare earth-cobalt-containing nitrate solution containing an undissolved residue containing iron, and separating said undissolved residue containing iron from said rare earth-cobalt-containing nitrate solution by filtration.

2. The method as claimed in claim 1 wherein said rare earth-iron alloy containing cobalt is selected from the group consisting of rare earth-iron alloy wastes, swarf of rare earth-iron alloy, rare earth-iron alloy slug, and mixtures thereof.

3. The method as claimed in claim 1 wherein said rare earth-iron alloy containing cobalt contains rare earth metal, iron, cobalt, and a metal selected from the group consisting of Al, B, Ti, Ni, V, Nb, Ta, Cr, Mo, W, Ga, Hf, Zr, and mixtures thereof.

4. The method as claimed in claim 1 further comprising the steps of:

TABLE 1

|  | Recovery Method | Purity of Rare Earth Elements (%) | Recovery Ratio of Rate Earth Elements (%) | Purity of Cobalt (%) | Recovery Ratio of Cobalt (%) | Chlorine Content in Rare Earth Salts (%) |
|---|---|---|---|---|---|---|
| Example 1 | With Fluorine Compound | 99.9 | 97.8 | 99.8 | 97.0 | Not Detected |
|  | With Oxalic Acid | 99.9 | 99.8 | 86.5 | 96.6 | Not Detected |
| Example 2 | With Fluorine Compound | 99.9 | 96.8 | 99.8 | 96.8 | Not Detected |
|  | With Oxalic Acid | 99.9 | 97.2 | 99.8 | 95.3 | Not Detected |
| Example 3 | With Oxalic Acid | 99.9 | 98.0 | 99.7 | 95.7 | Not Detected |
| Comp. Ex. 1 | With Fluorine Compound | 99.8 | 87.1 | — | 0 | Not Detected |
| Comp. Ex. 2 | With Carbonate | 96.7 | 96.4 | — | 0 | 0.36 |

TABLE 2

|  |  | Amount of Nd Oxide Recovered (g) | Recovery Ratio of Nd Oxide % | Amount of Dy Oxide Recovered (g) | Recovery Ratio of Dy Oxide % | Purity of Dy Oxide (%) |
|---|---|---|---|---|---|---|
| Example 3 | Primary Solution | 162.9 | 88.2 | 0.7 | 16.5 | 0.4 |
|  | Secondary Solution | 21.8 | 9.8 | 3.3 | 81.5 | 13.1 |
|  | Total | 184.7 | 98.1 | 4.0 | 98.0 | — | adding a fluorine compound to said separated rare earth-cobalt-containing nitrate solution to precipitate rare earth fluorides, and separating said precipitated rare earth fluorides from the nitrate solution containing residual cobalt by filtration.

5. The method as claimed in claim 4 wherein said fluorine compound is selected from the group consisting of an acidic ammonium fluoride solution, a hydrofluoric acid solution, and mixtures thereof, each having a concentration of 0.5 to 5 N.

6. The method as claimed in claim 4 wherein an amount of said fluorine compound added to said rare earth-cobalt-containing nitrate solution is 1.1 to 1.3 equivalent of rare earth elements contained in said rare earth-cobalt-containing nitrate solution in terms of fluorine ions contained therein.

7. The method as claimed in claim 1 further comprising the steps of:

adding a component selected from the group consisting of oxalic acid, ammonium oxalate, and mixtures thereof to said separated rare earth-cobalt-containing nitrate solution to precipitate rare earth oxalates, and separating said precipitated rare earth oxalates from a nitrate solution containing residual cobalt by filtration.

8. The method as claimed in claim 7 wherein an amount of said component is 1.1 to 1.3 equivalent of rare earth elements contained in said rare earth-cobalt-containing nitrate solution.

\* \* \* \* \*